April 9, 1957 R. A. WITTREN 2,788,077
TRACTOR WHEEL ASSEMBLY FOR WHEEL TREAD VARIATION
Filed Sept. 30, 1954 2 Sheets-Sheet 1

INVENTOR.
R. A. WITTREN

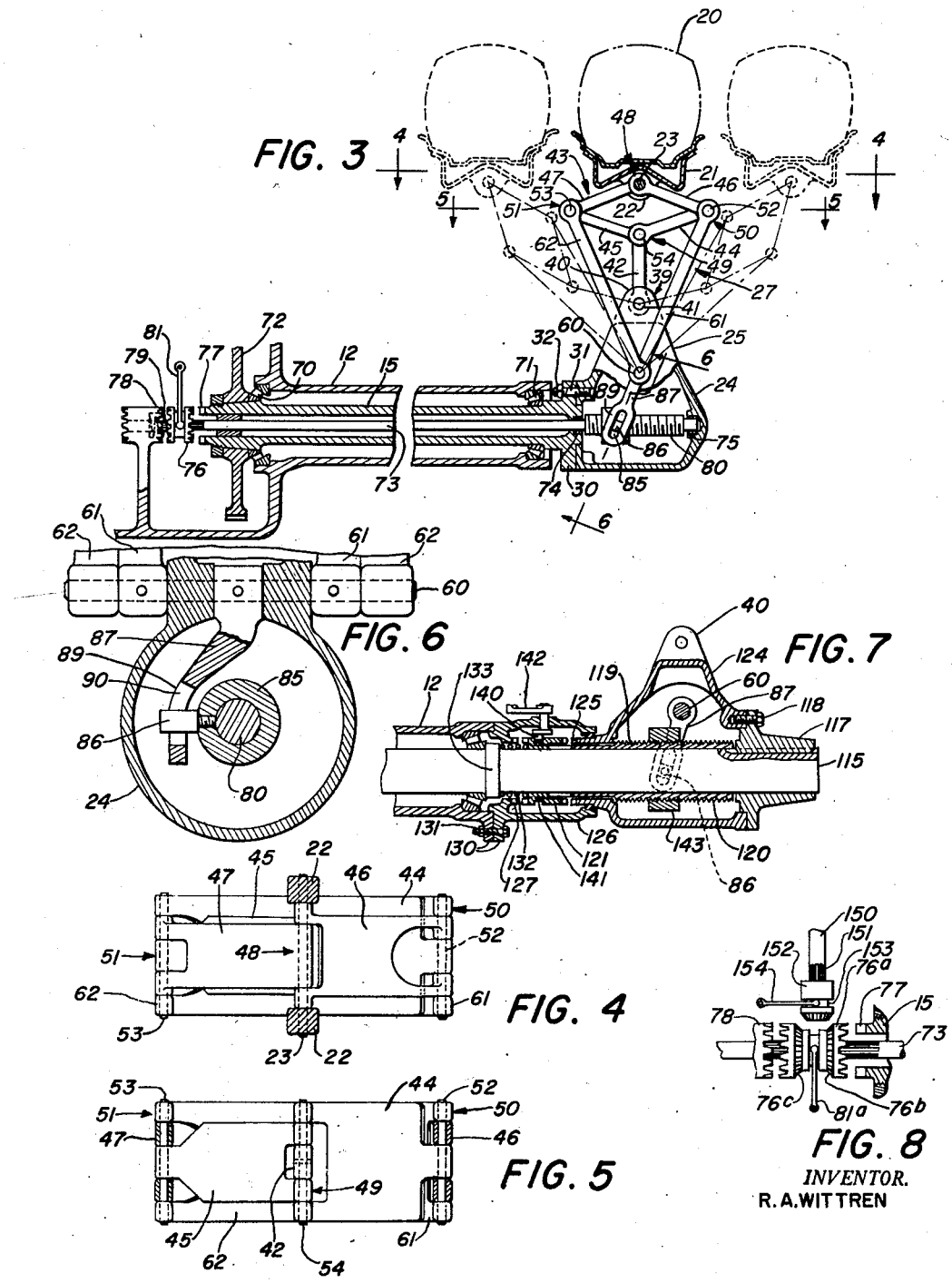

2,788,077

TRACTOR WHEEL ASSEMBLY FOR WHEEL TREAD VARIATION

Richard A. Wittren, Cedar Falls, Iowa, assignor to Deere Manufacturing Co., Dubuque, Iowa, a corporation of Iowa Application September 30, 1954, Serial No. 459,396

28 Claims. (Cl. 180—75)

This invention relates to a wheel and axle assembly for use on a tractor and like vehicles and the adjusting means used for the purpose of obtaining wheel tread variations.

Probably the simplest method of obtaining wheel tread variations for tractors consists of providing a wheel structure in which the rim is disposed in an axially offset position relative to the wheel body, so that the rim can be removed and reversed and then repositioned on the wheel body with the offset axially in the other direction. Interchangeability of the rim of this type from one side or the other of the wheel normally produces four tread positions for each wheel.

Another method of obtaining wheel tread variation is to utilize externally threaded axles and internally threaded hubs and to use differential power for threading the hub axially on the axle. Analogous to this is the innovation where there is provided a rim having a helix type rib portion on its inner periphery cooperative to receive lugs on the outer periphery of the wheel body to move the former axially upon relative rotation between the two.

While the latter proposals have the advantage over the former in that they provide a wider range for wheel tread adjustment and also use differential power to obtain the adjustment, certain problems and disadvantages nevertheless exist. Prominent among these disadvantages with the threaded axle type is the requirement of an extra long axle and also the requirement of an enlarged axle diametrically to overcome the structural weakening resulting from the threading of the axle.

Common among all three of these methods of obtaining wheel tread variation is the lack of being a completely automatically adjustable system since all of them require a clamping or locking means between the rim and the wheel body or the hub and the axle, as the case may be, to prevent relative movement between the wheel parts under normal operating conditions. In all cases the handling of the clamps and the locks is done manually which requires a stoppage of the tractor.

It is therefore the main object of this invention to provide means for obtaining wheel tread variation that is selectively and fully automatically adjustable and that utilizes tractor power to move the wheels for tread adjustment.

It is also an object of this invention to provide a new and novel wheel structure designed to provide axial variation of the rim and tire while the hub remains in a fixed axial position. By maintaining the hub in a fixed position the complete range of wheel adjustment can be obtained without reversing rims or using special long axles. No clamping and unclamping of the wheel is required and no keys need be removed or replaced.

Specifically the wheel structure comprises a rim and a wheel body including hub means for mounting the wheel on the axle and extendible and retractable linkages circumferentially spaced on the hub and extending from the hub to the rim. To obtain wheel tread variation the linkages are swung axially, causing the rim to move axially, by control members or arms mounted on the hub and connected to the linkages. As will become clear as the description progresses, the control arms and linkages cooperate to support the rim radially as well as affording axial adjustment of the rim.

Other objects and benefits of the invention will become apparent to one skilled in the art from the following description taken in conjunction with the accompanying drawings, in which Figure 1 is a rear view of a tractor featuring a rear axle and wheel assembly embodying the principles of this invention. Minimum and maximum rear wheel tread variation is shown in dotted representation.

Figure 3 is a sectional view of the axle and wheel structure taken along line 3—3 of Figure 2 and showing the development of one of the linkages extending from the hub to the rim and the means contained in the axle for imparting axial movement to the linkage. Also shown in dotted representation is the linkage disposition when the wheel is in the extremities of its axially adjusted positions.

Figure 4 is a sectional view taken substantially along the line 4—4 of Figure 3.

Figure 5 is a sectional view taken along the line 5—5 of Figure 3.

Figure 6 is an enlarged sectional view taken along the line 6—6 of Figure 3.

Figure 7 is a sectional view of the axle similar to Figure 3 but modified to show the linkage control mechanism as applied to a solid type axle.

Figure 8 is a plan view of a modification of the clutch mechanism shown in Figure 3 with a portion of the axle shown in section.

Figure 1:
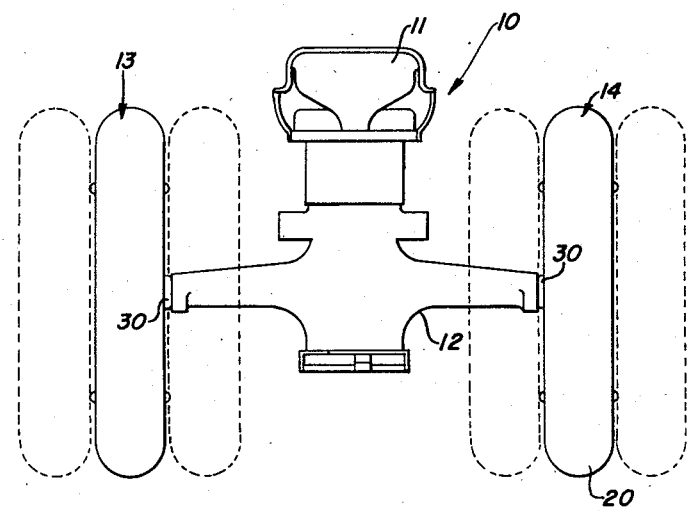
Figure 2:
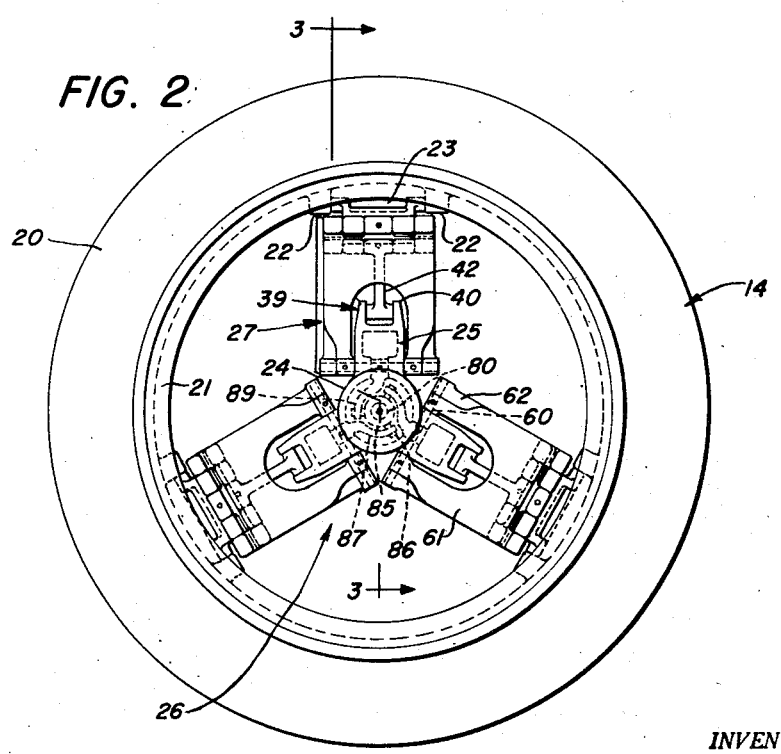
Figure 2 is a side view of the rear right wheel structure embodying the invention.

Now referring to Figures 1 through 6, reference numeral 10 denotes a tractor of any commercial design having an operator's station 11 and an axle housing 12 carried by a pair of transversely spaced apart tractor wheels 13 and 14. Each of the tractor wheels is mounted on a laterally disposed axle 15. In this embodiment of the invention the axle 15 will be shown to be one of a hollow type. Details of the invention will be described in reference to the rear right wheel and axle assembly and the adjusting means associated therewith. With slight variations, which would be apparent to one skilled in the art, the right and left wheel and axle assemblies and the adjusting means associated therewith are similar.

The wheel structure comprises a traction tire 20, a tire retaining rim 21 having on its inner periphery angularly spaced linkage receiving means that include suitable lugs 22 apertured to receive a pivot pin 23 which is also a part of a linkage 27 referred to in detail later, a wheel hub 24 having angular spaced radially outwardly projecting ribs 25 corresponding respectively with the angular spacing of the linkage receiving means on the rim 21, and a wheel body 26 made up of rim supporting linkage means here shown as comprising individual linkages 27 extending from the rib 25 to the corresponding linkage receiving means.

On the axially outermost end of the axle 15 and integral therewith is a radially extending collar 30 apertured to receive threaded studs 31 extending axially inwardly from the hub 24. Stud nuts 32 cooperate with the studs 31 to serve as means for removably but fixedly connecting the hub to the axle 15.

Before describing specifically the linkage 27 it should here be noted that a simple straight line mechanism common to the mechanical linkage art is utilized for the purpose of this invention. Of the several approximate and straight line mechanisms available, that referred to as Peaucellier's cell is used. However, it should be recognized that other such types of mechanism would be suitable and while we have used this particular linkage we do not wish or intend to limit the invention only to that linkage. It should also be noted that in this specification and particularly in reference to the Peaucellier's linkage the term "lateral" and "axial" are used synonymously and shall refer to the same directional motion.

Each of the angularly spaced apart ribs 25 supports a first link connection 39 made up of radially outwardly projecting and bifurcated rib portions 40 that are part of the hub with each furcation being apertured to receive a pivot pin 41 upon which is mounted thereon one end of an axially swingable link member 42. An extendible and retractable linkage, here in the form of a parallelogram type of link quadrangle 43, is made up of respective links 44, 45, 46 and 47. Each of the links 44—47 are bifurcated at either one end or at both ends, depending upon the requirement, to receive between the furcations the opposite ends of the successive link and each end of each link is suitably machined to fit upon a pivot pin that lies transversely to the axis of rotation of the wheel and combines with the pin to form a respective pivot joint. Specifically, links 46 and 47 are mounted on pivot pin 23 to form a radially outermost pivot joint 48 connected to the rim 21, links 44 and 45 are mounted on a respective pivot pin 54 to form a radially intermost pivot joint 49, link members 43 and 45 are mounted on a pivot pin 53 to form a respective pivot joint 51, and links 46 and 44 are mounted on a pivot pin 52 to form a respective pivot joint 50. The pivot joints 50 and 51 are axially spaced apart. Also mounted on the radially innermost pivot joint 49 is the radially outward end of the swingable link member 42.

On the hub 24 is a second link connection comprising a rockshaft member 60 disposed transversely to the axis of rotation. In accordance with the principles of Peaucellier's cell the distance between the first link connection 39 and the second link connection is equal to the length of the swingable link member 42 as measured from the center of the respective pivot pins 41 and 54. Linkage control means in the form of a laterally swingable control member or lever arm 61 extends from the hub 24 where it is fixed to rotate with the rockshaft 60 to the link quadrangle where it is pivotally mounted on the pivot pin 52 so as to impart lateral movement of the quadrangle 43 and link member 42 in response to rocking motion of the rockshaft 60. A guide arm or link 62 extends between and is free to rotate on the pivot pin 53 and the rockshaft 60.

As best shown in Figure 3, the linkage means operates in the following manner. As the rockshaft 60 is rocked on its axis, the control arm 61 will swing the quadrangle 43 laterally relative to the hub 24 resulting in the rim 21 and tire 20 moving axially. Thus, the wheel tread is regulated by linkage control means comprising the rockshaft 60, the lever arm 61, and a rock arm 87 that serves to rock the rockshaft 60 and will later be described more fully. While the control member or lever 61 serves to move the quadrangle laterally it also acts in conjunction with the guide link 62 and the link member 42 whereby all three serve as control members to extend or retract the quadrangle linkage 43 to adjust the latter so that the outermost joint 48, as represented by the part or pin 23, will move in a path at all times equally distant from the axis of rotation irrespective of the axial position of the rim. Thus, while the control members and quadrangle provide axial movement of the wheels they also provide in conjunction with the hub structural means for supporting the rim radially as well as for axial or lateral adjustment, in addition to serving as wheel spokes.

For a further clarification of the operation of the linkage means and by viewing the means in a somewhat different approach, links 46, 47, the lever arm 61, and the guide arm 62 may be considered as forming a quadrilateral having a radially outermost joint 48 pivotally mounted on the rim 21, a radially innermost joint as formed by lever arm 61 and guide arm 62 mounted on the rockshaft 60, and two axially spaced apart pivot joints 50, 51. Viewing the mechanism in this manner, the links, 44, 45 and the link member 42 act as an adjustable linkage extending from the pivot joints 50, 51 to the hub 24 and become regulating means serving to adjust the spacing between the pivot joints 50, 51 so that as the quadrilateral is swung axially the outermost joint 48 will move in a path at all times equal distance from the axis of rotation.

Rim adjusting means operative by rotation of the axle 15 to rock the rockshaft 60 and move the rim axially are best shown in Figures 3 and 6. The hollow type axle 15 is journaled in the axle housing 12 by suitable thrust bearings 70 and 71. A differential is terminated in the drive gear 72 fixed to the axle 15.

A shaft 73, positioned internally and concentric with the hollow-axle 15, is supported in the wheel hub 24 by combination radial and thrust bushings 74, 75. The axially outermost end of the shaft 73 has a threaded portion 80 and the axially innermost end of the shaft is splined and has slidably but non-rotatably mounted thereon a ring 76 equipped with matching jaw clutches on both faces. The inner end of the axle 15 is provided with a face type jaw-clutch 77 that will mesh with the corresponding jaw-clutch face on the ring 76. A fixed jaw-clutch 78 on the axle housing 12 is disposed to mesh with the opposite jaw-clutch face of the ring 76. A spring, as represented by numeral 79, surrounds the end of the shaft 73 adjacent to the ring 76 and serves to bias the ring 76 to normally engage the jaw-clutch 77 on the axle. For clarity of description the clutch means, comprising the ring 76, the jaw-clutch 77, and the jaw-clutch 78, is shown in the drawings in the disengaged position.

A lever 81 is connected to the ring 76 for sliding the latter axially on the splined surface of the shaft 73. Suitable means remote from the wheel and axle assembly and not unlike other clutch actuating means common to the trade today are supplied to move the lever 81. Not being a necessary part to fully understand the invention details of the clutch actuating means are omitted.

A collar member 85 surrounds the shaft 73 and is internally threaded to engage the threaded portion 80 of the shaft. The collar member 85 is equipped with an extending pin and block 86 which engages a slot 90 of an arm 87. The arm 87 extends to and has one end portion fixed to the rockshaft 60. The opposite end portion of the arm 87 is offset in an arcuate section 89 substantially concentric with the shaft 73. The slot 90 is cut in the section 89 to accommodate a limited angular movement, limited respectively to the arcuate length of the slot 90, of the collar member 85 as it is threaded axially along the threaded portion 80 of the shaft 73. The arm 87 serves as connecting means between the internally threaded collar member 85 and the hub resulting in the collar member 85 rotating in unison with the wheel and axle assembly. The arm 87 also serves as rock arm means connecting the collar means, as represented by the collar member 85 and the extending pin and block 86, to the rockshaft member 60 whereby axial motion of the collar member 85 will result in rocking motion of the rockshaft member.

The operation of the rim adjusting means is in the following manner. As previously mentioned, the spring 79 biases the clutch ring 76 into engagement with the jaw-clutch 77 on the axle so that in a first or normal operating position the clutch means operates to cause the shaft 73 and axle 81 to rotate in unison. In this first position relative rotation between the collar member 85 and the threaded portion 80 of the shaft 73 will not occur. Consequently no tread adjustment will take place.

To change the wheel positions, lever 81 is used to move the clutch ring 76 to a detent or second position that disengages the clutch ring 76 from the axle clutch jaw 77 and causes the clutch ring 76 to engage the jaw-clutch 78 on the axle and differential housing 12. In the second position the wheel and axle is free to rotate while the shaft 73 is locked against rotation. Movement of the tractor forwardly will then cause relative rotation between the collar member 85 and the threaded portion 80 of the shaft 73. This will in effect advance the collar member 85 on the threaded portion 80 resulting in rocking of the rockshaft 60 and a consequential lateral or axial adjustment of the rim 21. The lateral adjustment of the rim can be stopped or locked simply by re-engaging the clutch ring 76 with the axle jaw-clutch 77. Backing the tractor will of course provide opposite axial movement of the rim than the movement of the tractor forwardly. Thus, the rim adjusting means comprises force transmitting means connected to the lever arm 61, causing lateral movement thereof which includes the shaft 73, the collar member 85, the arm 87, and the rockshaft 60, and axle engaging or disengaging means in the form of a clutch that selectively transmits rotating motion from the axle to the force transmitting means.

Referring now to Figure 7, rim adjusting means is shown in relation to a solid type axle. The hub 124 is removably but fixedly mounted on a solid type axle 115 by a collar 117 keyed to the axle outwardly of the hub and having angularly spaced stud bolts 118 threadedly engaging respective oppositely spaced tapped bores in the face of the hub.

A hollow type shaft or tube 119 having a threaded portion 120 disposed radially within the hub surrounds and, unless otherwise restricted, is free to rotate on the axle 15 and extends axially inwardly from the hub. Slidably but non-rotatably mounted on a splined portion of the axially inner end of the hollow shaft 119 is a double faced jaw-clutch 121. The inner extension of the hub 124 is faced with a jaw-clutch 125 that is normally engaged with the outer face of the jaw-clutch 121. Circumferentially spaced flanges 130 and suitable bolt and nut combinations 131 serve to fix a clutch housing 126 to the axle housing 12. A jaw-clutch 127 engageable with the inner face of the jaw-clutch 121 is fixed in the clutch housing 126. A spring 132 acting against a radial abutment 133 integral with the axle 115 biases the double-faced jaw-clutch 125 into normal engagement with the jaw-clutch on the hub 124.

Clutch operating means, operative from a source remote from the wheel and axle assembly, indicated in part by a dog 140 engageable with a circumferential slot 141 between the two faces of the jaw-clutch 121 and a lever 142 to move the double faced jaw-clutch 121 axially, is mounted on the clutch housing 126.

A collar member 143 is threadedly mounted on the threaded portion 120 of the hollow shaft 119 to operate the arm 87 in a manner similar to that already described in relation to the hollow type axle. The arm 87 is connected to the ring member 143 by the pin and block 86 and extends to the rockshaft 60.

The rim adjusting means of the solid type of axle operates in a manner similar to that already described in relation to the hollow type axle and should be apparent by review of Figure 6. By sliding one of the jaws of the clutch 121 to engage the fixed jaw-clutch 127 on the clutch housing 126 and driving the tractor forwardly or rearwardly, depending on the tread adjustment required, the collar member 143 will thread itself axially along the hollow shaft 119 causing the wheel rim to move laterally. By moving one of the jaws of the clutch 121 to a normal engaging position with the jaw 125 on the hub 124 the collar member 143 becomes locked against further axial or lateral movement.

A modification of the clutch means, shown in Figure 8, may be made to permit tread adjustment while the tractor is standing still. The modification is shown in relation to a hollow type axle but, as should be apparent, could be applied with slight variations to the solid type axle. A clutch ring 76a having matching jaw-clutches is slidably but non-rotatably mounted on the splined end of the shaft 73. In a manner already described the jaw-clutches are selectively engageable by use of a clutch lever 81a with the respective jaw-clutch 77 on the axle 15 and the fixed jaw-clutch 78 on the housing 12. Between the matching jaw-clutches of the clutch ring 76a a pair of oppositely disposed and matching miter gear faces 76b and 76c are provided. A fore-and-aft extending power shaft 150 having a splined end 151 is terminated proximate to and forwardly of the ring clutch 76a. Slidably but non-rotatably mounted on the splined end 151 of the shaft 150 is a miter pinion 152. The shank of the pinion 152 has a circumferential slot 153 that receives a forked lever 154. The lever 154 operates to slide the pinion 152 forwardly or rearwardly into or out of mesh with the miter gear 76b or 76c, along the splined end 151 of the drive shaft 150. The power shaft 150 is mounted in the differential housing and is suitably geared with the differential or other power source on the tractor for rotation and acts as an operative part from the power source for driving the clutch 76a when the miter pinion and gear is in mesh.

In normal operation or while the tractor is moving, the pinion 152 is held forwardly of the ring clutch 76a to provide uninterrupted axial movement of the clutch 76a along the shaft 73. Tread adjustment can then take place only by moving the tractor forwardly or rearwardly in a manner already described in relation to the clutch system in Figure 3.

When the tractor is stopped the axle 15 is of course held against rotation. Tread adjustment may then occur by adjusting the lever 154 to move the pinion 152 rearwardly so that upon axial movement of the ring clutch 76a one of the miter gear faces 76b or 76c meshes with the miter pinion 152. Rotation of the power shaft 150 will then result in relative rotation between the axle 15, since it is held against rotation, and the shaft 73. This will in effect cause the collar 85 to thread axially along the threaded portion 80 of the shaft 73 which as previously described will result in axial movement of the rim 21. Reversing the direction of axial movement of the rim requires only the sliding of the ring clutch 76a along the shaft 73 to engage the opposite miter gear face with the miter pinion. As will be clear from Figure 8, the pinion 152, when it is in its rearward position, also serves as a stop for limiting axial movement of the ring clutch 76a and as such serves to prevent engagement of the ring clutch 76a with either of the jaw-clutches 77 and 78 when the pinion is in that position. In this modification, therefore, the clutch ring 76a has a third position, besides the first and second positions previously described, that serves to utilize the power source to rotate the shaft 73 to obtain relative rotation between the axle 15 and the shaft 73.

It is recognized that variations of the invention described herein can unquestionably be ascertained by one skilled in the art. No doubt other mechanisms and systems differing materially in appearance could be introduced without departing from the fundamental concept of the invention. It is therefore desired not to limit or narrow the invention beyond the scope set forth in the appended claims.

What is claimed is:

1. A wheel structure designed for movement about an axis of rotation comprising an outer rim having on its inner periphery angularly spaced linkage receiving means, a hub having angularly radially outwardly projecting ribs, said angular spacing of the ribs corresponding respectively with the angular spacing of the linkage receiving means, and angularly spaced rim supporting linkage means extending from the hub to the linkage receiving means serving to prevent radial displacement of the rim and selectively adjustable to afford axial movement of the rim, each of said linkage means comprising an axially swingable member connected to said rib, an axially disposed extendible and retractable link quadrangle having a radially outermost pivot joint mounted on said link receiving means and a radially innermost pivot joint mounted on the axially swingable member, and linkage control means connected to the link quadrangle for selectively moving said quadrangle axially relative to the hub, and each of the pivots in the quadrangle being so spaced apart that when said quadrangle is moved axially by said linkage control means the said outermost joint will move in a path at all times of equal distance from the axis of rotation.

2. A wheel structure designed for movement about an axis of rotation comprising an outer rim having on its inner periphery angularly spaced linkage receiving means, a hub, and angularly spaced rim supporting linkage means extending from the hub to the linkage receiving means serving to prevent radial displacement of the rim and selectively adjustable to afford axial movement of the rim, each of said linkage means comprising an axially swingable member connected to said hub, an axially disposed extendible and retractable link quadrangle having a radially outermost pivot joint mounted on said link receiving means and a radially innermost pivot joint mounted on the axially swingable member, and linkage control means connected to the link quadrangle for selectively moving said quadrangle axially relative to the hub and each of the pivots in the quadrangle being so spaced apart that when said quadrangle is moved axially by said linkage control means the said outermost joint will move in a path at all times of equal distance from the axis of rotation.

3. A wheel structure designed for movement about an axis of rotation comprising an outer rim, a hub, and angularly spaced rim supporting linkage means extending from the hub to the rim, serving to prevent radial displacement of the rim and selectively adjustable to afford axial movement of the rim, each of said linkage means comprising an axially disposed extendible and retractable link quadrangle having a radially outermost pivot joint mounted on the rim, and linkage control members extending from the hub to the link quadrangle for selectively moving said quadrangle axially relative to the hub, said control members being cooperative with the quadrangle to maintain the outermost joint equally distant from the axis of rotation irrespective of the lateral position of the quadrangle.

4. A wheel structure designed for movement about an axis of rotation comprising an outer rim, a hub, and angularly spaced rim supporting linkage means extending from the hub to the rim serving to prevent radial displacement of the rim and selectively adjustable to afford axial movement of the rim, each of said linkage means comprising an axially disposed extendible and retractable linkage having a part thereof pivotally mounted on the rim, and linkage control members extending from the hub to the linkage for selectively moving the rim axially, said control members being cooperative with said linkage to adjust the latter so that said part is maintained equally distant from the axis of rotation irrespective of the axial position of the rim.

5. A wheel structure comprising: an outer rim; a hub having radially spaced apart first and second link connections; circumferentially spaced rim supporting linkage means extending from the hub to the rim, each of said linkage means comprising a laterally swingable link equal in length to the distance between the first and second connections and having one end pivotally connected to said first link connection, a laterally disposed parallelogram type link quadrangle having a radially outermost pivot joint mounted on said rim, a radially innermost pivot joint mounted at the other end of the laterally swingable link, and a pair of laterally spaced apart pivot joints, and a guide arm pivotally connected at one end to said second link connection and at the other end to one of the spaced apart pivot joints; and a lever arm non-rotatably mounted at one end to the second link connection and pivotally connected at the other end to the other laterally spaced apart pivot joint.

6. The invention defined in claim 5, further characterized by said second link connection residing in the form of a rockshaft member rotatably mounted on the hub and having fixed thereon a rock arm for receiving rocking motion from a source remote from the wheel.

7. A wheel and axle assembly for obtaining wheel tread variation in agricultural tractors and like vehicles comprising: an axle having a wheel receiving end; a hub mounted on the wheel receiving end; a rim with linkage receiving means mounted on its inner periphery; angularly spaced rim supporting linkage means extending from the hub to the respective linkage receiving means and serving to prevent relative radial displacement of the rim respective to the axis of rotation and selectively adjustable to provide axial movement of the rim, each of said linkage means comprising an extendible and retractable linkage having a first pivot connected to the linkage receiving means and a second pivot connected to the hub, said linkage being axially disposed and axially swingable about the aforesaid pivots, linkage control arms mounted on said hub and connected to said linkage for imparting axial movement to the rim in response to movement of said arms, said control arms and links of said linkage being of such length and the connections thereof to the hub and to one another being so spaced apart that when the linkage is swung to varying axial positions said first pivots will be maintained at a constant distance from the axis of rotation; force transmitting means extending between the axle and the control arms; and adjusting means mounted on the axle for engaging or disengaging the force transmitting means with said axle to selectively move the control arms in response to rotation of the axle.

8. A wheel and axle assembly for obtaining wheel tread variation in agricultural tractors and like vehicles comprising: an axle having a wheel receiving end; a hub mounted on the wheel receiving end; an angularly spaced rim supporting linkage means extending from the hub to the rim; linkage control arms mounted on said hub and connected to said linkage means for imparting movement of the rim laterally relative to the hub in response to movement of said arms, said control arms and links of said linkage means being of such length and the connections thereof being so spaced apart that when the rim is moved to varying lateral positions said linkage means shall serve to prevent radial displacement of the rim relative to the axis of rotation; force transmitting means extending between the axle and the control arms; and adjusting means mounted on the axle for engaging or disengaging the force transmitting means with said axle to selectively move the control arms in response to rotation of the axle.

9. A wheel and axle assembly for obtaining wheel tread variation in agricultural tractors and like vehicles comprising: an axle having a wheel receiving end; a hub mounted on the wheel receiving end; a rim; angularly spaced rim supporting extendible and retractible linkage means extending from the hub to the rim; and linkage control means mounted on said hub and connected to said linkage means for imparting movement of the rim laterally relative to the hub, the links of said linkage means being of such length and the connections thereof being so spaced that when the rim is moved to varying lateral positions said linkage means shall serve to prevent radial displacement of the rim relative to the axis of rotation.

10. A wheel assembly for obtaining wheel tread variation in agricultural tractors and like vehicles comprising: a hub, a rim; angularly spaced rim supporting extendible and retractible linkage means extending from the hub to the rim; and linkage control means mounted on said hub and connected to said linkage means for imparting movement of the rim laterally relative to the hub, the links of said linkage means being of such length and the connections thereof being so spaced that when the rim is moved to varying lateral positions said linkage means shall serve to prevent radial displacement of the rim relative to the axis of rotation.

11. A wheel assembly for obtaining wheel tread variation in agricultural tractors and like vehicles comprising: a hub; a rim; angularly spaced rim supporting extendible and retractible linkage extending from the hub to the rim; and linkage control means connected to said linkage means and operative from a source remote from the wheel for imparting movement of the rim laterally relative to the hub, the links of said linkage means being of such length and the connections thereof being so spaced that when the rim is moved to varying lateral positions said linkage means shall serve to prevent radial displacement of the rim relative to the axis of rotation.

12. An axle; wheel means mounted on the axle comprising a rim, structural means supporting the rim radially and for axial adjustment, said structural means including hub means fixedly mounted on the axle for causing the axle and wheel means to rotate in unison; and rim adjusting means operative to move the rim axially, comprising a shaft concentric with and supported by the axle and having thereon a threaded portion, clutch means mounted on the shaft and engageable in a first position with the axle to cause the axle and shaft to rotate in unison, and engageable in a second position to lock the shaft against rotation, a collar member mounted on and having an internally threaded surface cooperative with the threaded portion of the shaft and operation to rotate in unison with the axle resulting in axial movement of the collar member when the shaft is locked against rotation; and control means extending between the collar member and the rim imparting axial movement of the rim upon axial movement of the collar member.

13. An axle; wheel means mounted on the axle comprising a rim, structural means supporting the rim radially and for axial adjustment, said structural means including hub means fixedly mounted on the axle for causing the axle and wheel means to rotate in unison; and rim adjusting means operative to move the rim axially comprising a shaft concentric with and supported by and mounted within the axle and having thereon a threaded portion with said shaft being freely rotatable within the axle, clutch means mounted on the shaft and engageable in a first position with the axle to cause the axle and shaft to rotate in unison and engageable in a second position to lock the shaft against rotation, a collar member mounted on and having an internally threaded surface cooperative with the threaded portion of the shaft and operative to rotate in unison with the axle resulting in axial movement of the collar member when the shaft is locked against rotation; and control means extending between the collar member and the rim imparting axial movement of the rim upon axial movement of the collar member.

14. An axle; wheel means mounted on the axle comprising a rim, structural means supporting the rim radially and for axial adjustment, said structural means including hub means fixedly mounted on the axle for causing the axle and wheel means to rotate in unison; and rim adjusting means operative to move the rim axially comprising a tubular shaft concentric with an mounted on the axle and having thereon a threaded portion with said shaft being rotatable relative to the axle, clutch means mounted on the axle and engageable in a first position to cause the axle and shaft to rotate in unison, and engageable in a second position to lock the shaft against rotation, a collar member mounted on and having an internally threaded surface cooperative with the threaded portion of the shaft and operative to rotate in unison with the axle resulting in axial movement of the collar member when the shaft is locked against rotation; and control means extending between the collar member and the rim imparting axial movement of the rim upon axial movement of the collar member.

15. The invention defined in claim 12, further characterized by said control means comprising a rockshaft member mounted on the wheel means and having its axis transverse to the axis of rotation and spaced therefrom, axially swingable lever arm means fixed to the rockshaft member and connected to the rim, and rock arm means connecting the collar member to the rockshaft member whereby axial motion of the collar member will result in rocking the rockshaft member.

16. A wheel structure designed for movement about an axis of rotation comprising an outer rim, a hub, and angularly spaced rim supporting linkage means extending from the hub to the rim, serving to prevent radial displacement of the rim and selectively adjustable to afford axial movement of the rim, each of said linkage means comprising an axially disposed extendible and retractable quadrilateral linkage having a radially outermost pivot joint mounted on the rim, a radially innermost joint mounted on the hub, and a pair of axially spaced apart pivot joints, rim adjusting means connected to the quadrilaterial selectively swinging the quadrilateral axially about its innermost pivot, and an adjustable linkage extending from the pair of axially spaced apart pivot joints to the hub and serving to adjust the spacing between the axially spaced apart pivot joints so that as the quadrilateral is swung axially the outer joint will move in a path at all times equal distance from the axis of rotation.

17. A wheel structure designed for movement about an axis of rotation comprising an outer rim, a hub, and angularly spaced rim supporting linkage means extending from the hub to the rim, serving to prevent radial displacement of the rim and selectively adjustable to afford axial movement of the rim, each of said linkage means comprising an axially disposed extendible and retractible quadrilateral linkage having a radially outermost pivot joint mounted on the rim, a radially innermost joint mounted on the hub, and a pair of axially spaced apart pivot joints, rim adjusting means connected to the quadrilateral selectively swinging the quadrilateral axially about its innermost pivot, and regulating means connected to the quadrilateral and serving to adjust the spacing between the axially spaced apart pivot joints so that as the quadrilateral is swung axially the outer point will move in a path at all times equal distance from the axis of rotation.

18. An axle; wheel means mounted on the axle comprising a rim, structural means supporting the rim radially and for axial adjustment, said structural means including hub means fixedly mounted on the axle for causing the axle and wheel means to rotate in unison; and rim adjusting means operative to adjust the rim axially comprising, a shaft concentric with and mounted for rotation relative to the axle and having thereon a threaded portion, a threaded member cooperative with the threaded portion of the shaft and connected to the axle for rotation in unison with the axle; clutch means selectively operative to cause the axle and shaft to rotate in unison or relative to one another resulting in axial movement of the threaded member in response to relative rotation between the axle and shaft, and control means extending between the threaded member and the rim imparting axial movement of the rim upon axial movement of the threaded member.

19. An axle; wheel means mounted on the axle comprising a rim, structural means supporting the rim radially and for axial adjustment, said structural means including hub means fixedly mounted on the axle for causing the axle and wheel means to rotate in unison; and rim adjusting means operative to adjust the rim axially comprising, a shaft concentric with and mounted for rotation relative to the axle and having thereon a threaded portion, a threaded member cooperative with the threaded portion of the shaft to move axially upon relative rotation between the shaft and the member and connected to the axle for rotation in unison with the axle; clutch means selectively engageable in a first position to cause the axle and shaft to rotate in unison, in a second position to lock the shaft against rotation resulting in relative rotation between the axle and shaft as the axle is rotated, and in a third position engagable with an outside power source to cause rotation of the shaft relative to the axle resulting in axial movement of the threaded member, when the axle is held against similar rotation, and control means extending between the threaded member and the rim imparting axial movement of the rim upon axial movement of the threaded member.

20. An axle; wheel means mounted on the axle comprising a rim, structural means supporting the rim radially and for axial adjustment, said structural means including hub means fixedly mounted on the axle for causing the axle and wheel means to rotate in unison; and rim adjusting means operative to adjust the rim axially comprising, a shaft concentric with and mounted for rotation relative to the axle, a member operative from the shaft to move axially upon relative rotation between the shaft and the member and connected to the axle for rotation in unison with the axle; clutch means between the axle and shaft selectively engageable to cause rotation in unison or relative rotation between the shaft and axle, and control means extending between the member and the rim imparting axial movement of the rim in response to axial movement of the threaded member.

21. In a vehicle having supporting structure and containing a power source for operation: an axle journaled on said structure; wheel means concentric on the axle and including hub means fixed to the axle and a rim encircling the hub means and arranged for axial adjustment relative to the hub and axle; and rim adjusting means operative to move the rim axially comprising, a shaft journaled on the supporting structure concentric with the axle and having thereon a member-engagable portion, a member engageable with the portion of the shaft operative to move axially upon relative rotation of the shaft and connected to the axle for rotation in unison with the axle; clutch means engageable in a first position to cause the axle and shaft to rotate in unison, in a second position to lock the shaft against rotation thereby creating relative rotation when the axle is rotated, and in a third position in engage an operative part from the power source to create rotation of the shaft relative to the axle and control means extending between the member and the rim imparting axial movement of the rim in response to axial movement of the collar member.

22. In a vehicle having supporting structure and containing a power source for operation: an axle journaled on said structure; wheel means concentric on the axle and including hub means fixed to the axle and a rim encircling the hub means and arranged for axial adjustment relative to the hub and axle; and rim adjusting means operative to move the rim axially comprising, a shaft journaled on the supporting structure concentric with the axle and having thereon a member-engageable portion, a member engageable with said portion of the shaft operative to move axially upon relative rotation between the member and the shaft and connected to the axle for rotation in unison with the axle; clutch means selectively engageable with an operative part of the power source to rotate the shaft relative to the axle and control means extending from the member to the rim imparting axial movement of the rim in response to the axial movement of the member.

23. A wheel structure designed for movement about an axis of rotation and for mounting on an axle comprising: a wheel hub; a rim; a wheel body mounted on the hub supporting the rim radially and including means therein supporting the rim for lateral adjustment; rockshaft means mounted on the hub rockable about an axis of rotation transverse to the axis of rotation of the wheel; and laterally swingable lever arm means connected to the aforesaid rockshaft means and to the rim for imparting movement of the rim laterally relative to the hub.

24. The invention defined in claim 23, further characterized by axle engaging means mounted in the hub for selectively engaging the axle to transmit rotating motion therefrom to the rockshaft means.

25. A wheel assembly for obtaining wheel tread variation in agricultural tractors and like vehicles comprising: a hub, a rim; angularly spaced rim supporting extendible and retractible linkage means extending from the hub to the rim; and linkage control means connected to said linkage means for imparting movement of the rim laterally relative to the hub, the links of said linkage means being of such length and the connections thereof being so spaced that when the rim is moved to varying lateral positions said linkage means shall serve to prevent radial displacement of the rim relative to the axis of rotation.

26. A wheel assembly for obtaining wheel tread variation in agricultural tractors and like vehicles comprising: axle means; a rim; angularly spaced rim supporting extendible and retractible linkage means extending from the axle means to the rim; and linkage control means carried on said axle means and connected to said linkage means for imparting movement of the rim axially, the links of said linkage means being of such length and the connections thereof being so spaced that when the rim is moved to varying axial positions the radial positions of the rim relative to the axis of rotation will remain constant.

27. The invention defined in claim 26 further characterized by said linkage means comprising a plurality of linkages spaced angularly relative to the axle and operative to maintain the rim at a fixed distance relative to the axis of the axle means.

28. The invention defined in claim 26, further characterized by control means carried by the axle means operative to selectively extend or retract the linkage means, said control means including clutch means adaptable to cause the control means to adjust the linkage in response to rotation of the axle means.

References Cited in the file of this patent

UNITED STATES PATENTS

| | | |
|---|---|---|
| 2,173,419 | Johnson | Sept. 19, 1939 |
| 2,454,130 | Braun | Nov. 16, 1948 |